United States Patent

Wang et al.

[11] Patent Number: 5,948,605
[45] Date of Patent: *Sep. 7, 1999

[54] ULTRAVIOLET RAY ABSORBING POLYMER LATEX COMPOSITIONS, METHOD OF MAKING SAME, AND IMAGING ELEMENTS EMPLOYING SUCH PARTICLES

[75] Inventors: Yongcai Wang, Penfield; Dennis Edward Smith, Rochester; James Lee Bello, Rochester; Kurt Michael Schroeder, Rochester, all of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/698,749

[22] Filed: Aug. 16, 1996

[51] Int. Cl.⁶ ..................................................... G03C 1/815
[52] U.S. Cl. ........................... 430/512; 430/514; 430/931
[58] Field of Search ..................................... 430/512, 514, 430/931; 523/234; 524/206, 230, 231, 232, 157, 158, 159

[56] References Cited

U.S. PATENT DOCUMENTS

| | | |
|---|---|---|
| 2,739,888 | 3/1956 | Sawdey . |
| 3,215,530 | 11/1965 | Riebel et al. . |
| 3,352,681 | 11/1967 | Ohi et al. . |
| 3,707,375 | 12/1972 | Ohi et al. . |
| 4,199,363 | 4/1980 | Chen . |
| 4,304,769 | 12/1981 | Chen . |
| 4,368,258 | 1/1983 | Fujiwhara et al. . |
| 4,455,368 | 6/1984 | Kojima et al. . |
| 4,645,735 | 2/1987 | Sugimoto et al. ....................... 430/512 |
| 5,110,717 | 5/1992 | Czekai et al. . |
| 5,215,876 | 6/1993 | Pruett et al. . |
| 5,288,598 | 2/1994 | Sterman et al. . |
| 5,536,628 | 7/1996 | Wang et al. . |

Primary Examiner—Thorl Chea
Attorney, Agent, or Firm—Carl F. Ruoff

[57] ABSTRACT

The present invention provides UV absorbing particles which are a polymerization reaction product of ethylenically unsaturated monomers selected from esters and amides of acrylic on methacrylic acid, vinyl esters, vinyl ethers, and vinyl nitrites; an initiator, a surfactant and an ultraviolet absorber having the general formula:

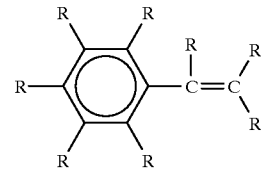

wherein R is each independently a hydrogen, halogen, alkyl, aryl, alkoxy, acyloxy, alkylthio, arylthio, amine, alkylamino, arylamino, hydroxyl, cyano, nitro, acylamino, sulfonyl, sulfamido, acyloxy and oxycarbonyl.

8 Claims, No Drawings

ULTRAVIOLET RAY ABSORBING POLYMER LATEX COMPOSITIONS, METHOD OF MAKING SAME, AND IMAGING ELEMENTS EMPLOYING SUCH PARTICLES

FIELD OF THE INVENTION

This invention relates to ultraviolet ray absorbing polymer particles, a method of making such particles and to an image element employing the same.

BACKGROUND OF THE INVENTION

It is conventional to incorporate an absorbing compound or absorber, in particular, an ultraviolet ray absorber, in an image element to absorb light in a specific wavelength region. The ultraviolet ray absorbing light-insensitive layer is used, for example, in a silver halide photographic element, to control the spectral composition of light incident upon a photographic emulsion layer, and to absorb or to remove ultraviolet light produced by static discharge, which occurs when the surfaces of the photographic element come into contact during production or treatment processes. Electric charges are generated by friction between surfaces. When accumulation of static electricity by charging reaches a certain limiting value, atmospheric discharge occurs at a particular moment and a discharge spark fires at the same time. When the photographic element is exposed to light by discharging, static marks appear after development.

Different methods for incorporating an ultraviolet ray absorber into a photographic element have been described in, for example, U.S. Pat. Nos. 2,739,888, 3,215,530, 3,352,681, and 3,707,375. Oil soluble ultraviolet ray absorbers are incorporated into photographic elements by dissolving the oil soluble absorber in a high boiling point organic solvent, and mixing under high shear or turbulence the organic solvent with an aqueous medium, which may also contain a surfactant, in order to break the organic phase into submicron particles dispersed in the continuous aqueous phase. However, when such dispersions are used in a light-insensitive layer, the layer becomes soft and the mechanical properties of the layer are lowered. Furthermore, even if no high boiling solvent point is used, many ultraviolet absorbers themselves are liquid, and they therefore can have a detrimental effect on the mechanical properties of the layer and adhesion with the adjacent layer. In order to prevent these problems, a large amount of gelatin is used in the layer containing ultraviolet ray absorbers. When the ultraviolet ray absorbers are incorporated in the outermost layer of an photographic element, they often migrate and crystallize at the surface of the layer. Therefore, an additional overcoat layer is used to minimize this undesirable blooming phenomenon.

U.S. Pat. No. 5,110,717 describes a method of incorporating an ultraviolet ray absorbing compound or coupler by mechanically grinding a crystalline material to a desired particle size in a liquid that is not a solvent for the material, heating the crystalline particles to above their melting point, and cooling the melted particles to form amorphous particles.

Ultraviolet ray absorbing polymer particles obtained by polymerization of ultraviolet ray absorbing monomers are also known in the art. Different methods can be used to prepare such particles, for example, by emulsion polymerization or by dispersion of preformed ultraviolet ray absorbing polymers. Disadvantages of using such polymer particles are their high cost and poor light stability.

Another method of incorporating an ultraviolet ray absorber into a photographic element is by loading such an absorber into pre-formed latex particles as described in U.S. Pat. Nos. 4,199,363, 4,304,769, 4,247,627, and 4,368,258. In this process, a hydrophobe, such as an ultraviolet ray absorber, is first dissolved in a water miscible organic solvent and then blended with an aqueous latex. However, removing the water miscible solvent subsequent to loading requires large scale processing equipment and lengthy processing times, which increases the expenses of the incorporation procedure and the cost of the resulting products.

U.S. Pat. No. 5,536,628 describes a process for incorporating absorbers into a pre-formed latex polymer particle. In the process a polymer latex of known solids is heated with stirring to 70 to 80° C. The absorbing compound is heated until it reaches its liquid state and is mixed with the polymer latex at high shear to generate an emulsion. The emulsion is then passed through a high energy homogenizer at least once to form an absorber impregnated latex polymer dispersion.

Processes described in U.S. Pat. Nos. 5,536,628, 4,199,363, 4,304,769, 4,247,627, and 4,368,258 can result in incomplete loading which leaves residual ultraviolet ray absorbers in the aqueous phase, which can then crystalllize or form large oil droplets during storage generating coating spot defects.

It is known in the art to use in photographic elements ultraviolet ray absorbers containing the following chemical structure unit:

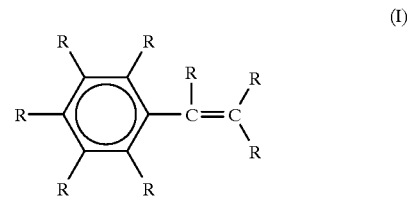

wherein R, may be the same or different, and each represents a hydrogen atom, a halogen atom, an alkyl, an aryl group having from 6 to 20 carbon atoms, an alkoxy group, an aryloxy, an alkylthio group, an arylthio group, an amine group, an alkylamino group, an arylamino group, an hydroxyl group, a cyano group, a nitro group, an acylamino group, a sulfonyl group, a sulfoamido group, an acyloxy group, or an oxycarbonyl group, or two neighboring R groups may form a 5 or 6-member ring by ring closure.

For example, the use of propyl 2-cyano-3-(4-methoxyphenyl)-2-propenoate in photographic elements is described in, for example, U.S. Pat. No. 5,288,598. However, such compounds are very prone to crystallization and therefore a large amount of high boiling solvent is needed for a stable dispersion.

Therefore, the foremost objective of the present invention is to provide an improved process for forming ultraviolet ray absorbing polymer particles in which a compound containing a chemical structure unit given by formula I is incorporated. Another object of the present invention is to provide an image element having at least one coated layer containing such ultraviolet ray absorbing polymer particles.

SUMMARY OF THE INVENTION

This invention provides an ultraviolet ray absorbing polymer particle by an emulsion polymerization process including mixing an ethylenically unsaturated monomer with an ultraviolet ray absorber containing a chemical structure unit given by Formula I, a surfactant, and an initiator, and polymerizing the ethylenically unsaturated monomer, the improvement comprising employing as the ethylenically unsaturated monomer esters and amides of acrylic or methacrylic acid, vinyl esters, vinyl ethers, and vinyl nitriles.

Another aspect of this invention is to provide an ultraviolet ray absorbing polymer particle comprising a polymer containing one or more monomers of esters and amides of acrylic or methacrylic acid, vinyl esters, vinyl ethers, and vinyl nitriles, and an ultraviolet ray absorber containing a chemical structure unit given by formula I.

A further aspect of this invention is to provide an image element having at least one coated layer containing an ultraviolet ray absorbing polymer particle comprising a polymer containing one or more monomers of esters and amides of acrylic or methacrylic acid, vinyl esters, vinyl ethers, and vinyl nitriles, and an ultraviolet ray absorber containing a chemical structure unit given by formula I.

ADVANTAGEOUS EFFECT OF THE INVENTION

Unique features of the ultraviolet ray absorbing polymer particle composition of this invention are the excellent stability of the ultraviolet ray absorber against degradation during the emulsion polymerization process. The level of ultraviolet ray absorber incorporation is high and the amount of latex particle aggregation is extremely low. This allows use of a lower concentration of latex in a coated layer in an imaging element to achieve the same level of ultraviolet ray absorption.

DETAILED DESCRIPTION OF THE INVENTION

The present invention contemplates a method of making an ultraviolet ray absorbing polymer particle in an emulsion polymerization process where an ultraviolet ray absorber having a composition given by formula I is mixed with an ethylenically unsaturated monomer together with an initiator and a surfactant. The emulsion polymerization process is well known in the art (see, for example, Padget, J. C. in *Journal of Coating Technology*, Vol 66, No. 839, pages 89–105, 1994; El-Aasser, M. S. and Fitch, R. M. Ed. *Future Directions in Polymer Colloids*, NATO ASI Series, No 138, Martinus Nijhoff Publishers, 1987; Arshady, R. *Colloid & Polymer Science*, 1992, No 270, pages 717–732; Odian, G. Principles of Polymerization, 2nd Ed. Wiley(1981); and Sorenson, W. P. and Campbell, T. W. *Preparation Method of Polymer Chemistry*, 2nd Ed, Wiley (1968)). The polymerization process is initiated in general with free radical initiators. Free radicals of any sort may be used. Preferred initiators include persulfates (such as ammonium persulfate, potassium persulfate, etc., peroxides (such as hydrogen peroxide), azo compounds (such as azobiscyanovaleric acid), and redox initiators (such as hydrogen peroxide-iron (II) salt, potassium persulfate-sodium hydrogen sulfate, etc.). Surfactants which can be used include, for example, a sulfate, a sulfonate, a cationic compound, an amphoteric compound, and a polymeric protective colloid. Specific examples are described in "McCUTCHEONI'S Volume 1: Emulsifiers & Detergents, 1995, North American Edition". Chain transfer agents may also be used to control the properties of the polymer particles formed.

In general, the amount of ultraviolet absorbers impregnated into the polymer particles can be anywhere within the range of 1:40 to 3:1 in terms of a weight ratio of ultraviolet ray absorber to polymer. It is preferred that the weight ratio is in the range of from about 1:10 to 2:1, and most preferably from about 1:5 to 1:1. The ultraviolet ray absorbing polymer particles have a mean size of from 0.01 to 0.5 $\mu$m, preferably from 0.02 to 0.3 $\mu$m, and most preferably from 0.03 to 0.2 $\mu$m.

Suitable ethylenically unsaturated monomers include, for example, an ester or an amide derived from an acrylic acid or ($\alpha$-alkylacrylic acid such as methacrylic acid (for example, methyl acrylate, methyl methacrylate, ethyl acrylate, ethyl methacrylate, hydroxyethyl methacrylate, acetoacetoxyethyl methacrylate, butoxyethyl acrylate, methoxypolyethylene glycol methacrylate, propyl acrylate, butyl acrylate, butyl methacrylate, ethylhexyl acrylate, cyclohexyl methacrylate, hexyl acrylate, octyl methacrylate, lauryl methacrylate, acrylamide, methacrylamide, methyl methacrylamide, cyclohexyl acrylamide, butyl acrylamide, N,N-dimethyl acrylamide, butyl methacrylamide, etc.), a vinyl ester (for example, vinyl acetate, vinyl propionate, vinyl laurate, vinyl butyrate, vinyl caproate, vinyl benzoate, etc.), a vinyl ether (for example, vinyl methyl ether, vinyl butyl ether, etc.), a vinyl nitrile (for example, acrylonitrile, methacrylonitrile, etc.), an ester of maleic acid, N-vinyl-2-pyrrolidone, vinyl chloride, vinylidene chloride, vinyl pyridine, and the like. In addition, crosslinking comonomers can be used to crosslink the polymer particles of the present invention. These are monomers which are polyfunctional with respect to the polymerization reaction, and include esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate, dienes such as butadiene and isoprene, esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, and polyfunctuional aromatic compounds such as divinyl benzene.

The present inventors have found unexpectedly that ultraviolet ray absorbing polymer particles made using aromatic monomers such as styrene, methyl styrene, etc. significantly degrade the ultraviolet ray absorbing power of compounds given by formula I during a polymerization reaction and are therefore inferior to ultraviolet ray absorbing polymer particles of this invention.

The ultraviolet ray absorbers useful for the present invention contain a chemical structure unit given by formula I. Preferred ultraviolet ray absorbers are represented by formula II.

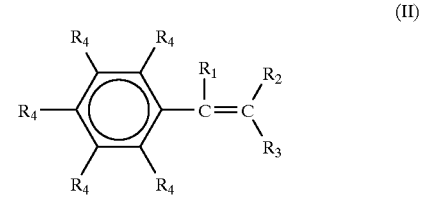

wherein $R_4$, may be the same or different, and each represents a hydrogen atom, a halogen atom, an alkyl, an aryl group having from 6 to 20 carbon atoms, an alkoxy group, an aryloxy, an alkylthio group, an arylthio group, an amine group, an alkylamino group, an arylamino group, an hydroxyl group, a cyano group, a nitro group, an acylamino group, a sulfonyl group, a sulfoamido group, an acyloxy group, or an oxycarbonyl group, or two neighboring $R_4$ groups may form a 5 or 6-member ring by ring closure. $R_1$ represent a hydrogen atom, or an alkyl group. $R_2$ or $R_3$ each represents a cyano group, —COOR$_9$, —CO—NHR$_9$, —SO$_2$R$_9$, CO—R$_9$, where R$_9$ represents an alkyl group, or an aryl group.

Most preferred ultraviolet ray absorbers are represented by formula III.

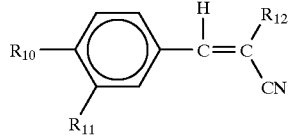

(III)

The examples for use in the present invention include, but are not limited to, the following compounds.

| Compound No. | $R_{10}$ | $R_{11}$ | $R_{12}$ |
|---|---|---|---|
| UV-1 | H | H | $CO_2C_{16}H_{33}$ |
| UV-2 | $CH_3$ | H | $CO_2C_{16}H_{33}$ |
| UV-3 | $CH_3$ | H | $CO_2C_3H_7$ |
| UV-4 | $CH_3$ | H | $CO_2C_{12}H_{25}$ |
| UV-5 | $CH_3$ | H | $SO_2C_{12}H_{25}$ |
| UV-6 | $OCH_3$ | H | $CO_2C_3H_7$ |
| UV-7 | $OCH_3$ | H | $CO_2C_5H_{11}$ |
| UV-8 | $OCH_3$ | H | 2-ethylhexyl |
| UV-9 | $OCH_3$ | H | $CO_2C_8H_{17}$ |
| UV-10 | $OCH_3$ | H | $CO_2C_9H_{19}$ |
| UV-11 | $OCH_3$ | H | $CO_2C_{10}H_{21}$ |
| UV-12 | $OCH_3$ | H | $CO_2C_{12}H_{25}$ |
| UV-13 | $OCH_3$ | H | $CO_2C_{16}H_{33}$ |
| UV-14 | $OCH_3$ | H | $CO_2C_{18}H_{37}$ |
| UV-15 | $OCH_3$ | H | $SO_2C_{12}H_{25}$ |
| UV-16 | $OCH_3$ | H | $SO_2C_{10}H_{21}$ |
| UV-17 | $OCH_3$ | H | $SO_2C_8H_{17}$ |
| UV-18 | $OCH_3$ | H | $SO_2C_6H_{13}$ |
| UV-19 | $OCH_3$ | H | $SO_2C_4H_9$ |
| UV-20 | $OCH_3$ | H | $SO_2C_3H_7$ |
| UV-21 | $OCH_3$ | H | $SO_2CH_3$ |
| UV-22 | $OC_3H_7$ | H | $CO_2C_3H_7$ |
| UV-22 | $OC_3H_7$ | H | $CO_2C_5H_{11}$ |
| UV-23 | $OC_3H_7$ | H | 2-ethylhexyl |
| UV-24 | $OC_3H_7$ | H | $CO_2C_8H_{17}$ |
| UV-25 | $OC_3H_7$ | H | $CO_2C_9H_{19}$ |
| UV-26 | $OC_3H_7$ | H | $CO_2C_{10}H_{21}$ |
| UV-27 | $OC_3H_7$ | H | $CO_2C_{12}H_{25}$ |
| UV-28 | $OC_3H_7$ | H | $CO_2C_{16}H_{33}$ |
| UV-29 | $OC_3H_7$ | H | $CO_2C_{18}H_{37}$ |
| UV-30 | $OC_3H_7$ | H | $SO_2C_{12}H_{25}$ |
| UV-31 | $OC_3H_7$ | H | $SO_2C_{10}H_{21}$ |
| UV-32 | $OC_3H_7$ | H | $SO_2C_8H_{17}$ |
| UV-33 | $OC_3H_7$ | H | $SO_2C_6H_{13}$ |
| UV-34 | $OC_3H_7$ | H | $SO_2C_4H_9$ |
| UV-35 | $OC_3H_7$ | H | $SO_2C_3H_7$ |
| UV-36 | $OC_3H_7$ | H | $SO_2CH_3$ |
| UV-37 | $OC_2H_5$ | $OCH_3$ | $CO_2C_2H_5$ |
| UV-38 | $OC_4H_9$ | $OCH_3$ | $CO_2C_2H_5$ |
| UV-39 | $OC_6H_5$ | $OCH_3$ | $CO_2C_2H_{52}OH$ |
| UV-40 | $OCH_2C_6H_5$ | OH | $CO_2C_2H_5$ |
| UV-41 | $OC_4H_9$ | $OCH_3$ | $CO_2C_2H_5$ |
| UV-42 | $OCH_2OCO_2C_2H_5$ | $OCH_3$ | $CONHC_6H_5$ |
| UV-43 | $OC_2H_4OCOCH_3$ | $OCH_3$ | $CONHCH_2C_6H_5$ |

Other types of ultraviolet ray absorbers can be used together with the ultraviolet ray absorbers containing the chemical structure unit given by formula I in the present invention to prepare ultraviolet ray absorbing polymer particles. Such ultraviolet ray absorbers include, for example, the thiazolidone type, the benzotriazole type, the benzophenone type, the butadiene type, and have been described in detail in, for example, U.S. Pat. Nos. 1,023,859, 2,685,512, 2,739,888, 2,748,021, 3,004,896, 3,052,636, 3,215,530, 3,253,921, 3,533,794, 3,692,525, 3,705,805, 3,707,375, 3,738,837, 3,754,919, and British Patent No 1,321,355. Most preferred ultraviolet ray absorbers have structures given by formulas IV and V.

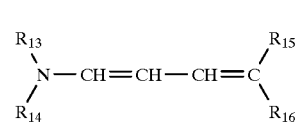

(IV)

where $R_{13}$, and $R_{14}$, which may be the same or different, each represents a hydrogen atom, an alkyl group, an aryl group, $R_{15}$ and $R_{16}$ each represents a cyano group, —$COOR_{17}$, $COR_{17}$, or $SO_2R_{17}$, where R17 represents an alkyl group, or an aryl group.

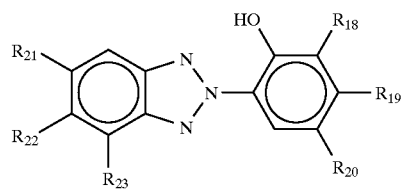

(V)

where $R_{18}$, $R_{19}$, $R_{20}$, $R_{21}$, $R_{22}$, and $R_{23}$ may be the same or different, and each represents a hydrogen atom, a halogen atom, a nitro group, an hydroxyl group, an alkyl group, an aryl group, an alkoxy group, an aryloxy group, an alkylthio group, an arylthio group, an aralkylthio group, an akoxycarbonyl group, a carbamoyl group, an alkylsulfonyl group, a mono or dialkylamino group, etc.

The imaging elements of this invention can be of many different types depending on the particular use for which they are intended. Such elements include, for example, photographic, electrophotographic, electro-statographic, photothermographic, migration, electrothermographic, dielectric recording and thermal-dye-transfer imaging elements. Photographic elements can comprise various polymeric films, papers, glass, and the like, but both acetate and polyester supports well known in the art are preferred. The thickness of the support is not critical. Support thickness of 2 to 10 mil (0.002 to 0.010 inches) can be used. The supports typically employ an undercoat or subbing layer well known in the art that comprises, for example, for polyester support a vinylidene chloride/methyl acrylate/itaconic acid terpolymer or vinylidene chloride/acrylonitrile/acrylic acid terpolymer.

Any suitable binder can be used in practice of the present invention. The binders include hydrophilic colloids such as gelatin as well as hydrophobic polymer resin binders. The actual amount of binder and ultraviolet ray absorbing particle will vary depending on the types of applications. It is preferred that the weight ratio of binder to the ultraviolet ray absorbing particle is from about 1:100 to 100:1, and more preferably from 20:80 to 95:5.

Useful resin binders include polyurethanes (e.g. Neorez R960 sold by ICI), cellulose acetates (e.g. cellulose diacetate, cellulose acetate butyrate, cellulose acetate propionate), poly(methyl methacrylate), polyesters (e.g. Vitel R sold by Goodyear Tire & Rubber Co.), polyamides (e.g. Unirez sold by Union Camp, Vesamide sold by General Electric Co.), polycarbonates (e.g. Makrolon sold by Mobay Chemical Co., Lexan sold by General Electric Co.), polyvinyl acetate, and the like.

Any suitable hydrophilic binder can be used in practice of this invention, such as naturally occurring substances such as proteins, protein derivatives, cellulose derivatives (e.g. cellulose esters), polysaccharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl sulfonic acid copolymers, vinyl imidazole copolymers, vinyl sulfide copolymers, homopolymer or copolymers containing styrene sulfonic acid, and the like. Gelatin is the most preferred hydrophilic binder.

Gelatin can be used together with other water dispersible polymers as binders in the practice of the present invention. The water dispersible polymers can be incorporated into either light sensitive or light-insensitive layers. Suitable water dispersible polymers include both synthetic and natural water dispersible polymers. Synthetic water dispersible polymers may contain a nonionic group, an anionic group, or a nonionic group and an anionic group in the molecular structure. The nonionic group may be, for example, an ether group, an ethylene oxide group, an amide group, or a hydroxyl group. The anionic group may be, for example, a sulfonic acid group or the salt thereof, a carboxylic acid group or the salt thereof, or a phosphoric acid group or the salt thereof. The natural water soluble polymer may include a nonionic group, an anionic group, or a nonionic group and an anionic group in the molecular structure. The water dispersible polymers may be incorporated into the photographic materials of the present invention in an amount of preferably at least 0.5 percent, preferably from 1 to 50 percent, and most preferably from 2 to 30 percent based on the amount of the whole coated amount of gelatin.

The image element of the present invention can contain at least one electrically conductive layer, which can be either surface protective layer or a sub layer. The surface resistivity of at least one side of the support is preferably less than $1\times10^{12}$ $\Omega$/square, more preferably less than $1\times10^{11}$ $\Omega$/square at 25° C. and 20 percent relative humidity. To lower the surface resistivity, a preferred method is to incorporate at least one type of electrically conductive material in the electrically conductive layer. Such materials include both conductive metal oxides and conductive polymers or oligomeric compounds. Such materials have been described in detail in, for example, U.S. Pat. Nos. 4,203,769; 4,237,194; 4,272,616; 4,542,095; 4,582,781; 4,610,955; 4,916,011; and 5,340,676.

The coating composition of the invention can be applied by any of a number of well-know techniques, such as dip coating, rod coating, blade coating, air knife coating, gravure coating and reverse roll coating, extrusion coating, slide coating, curtain coating, and the like. The ultraviolet ray absorbing particles and the binder are mixed together in a liquid medium to form a coating composition. After coating, the layer is generally dried by simple evaporation, which may be accelerated by known techniques such as convection heating. Known coating and drying methods are described in further detail in Research Disclosure No. 308, Published December 1989, pages 1007 to 1008.

The present invention will now be described in detail with reference to examples; however, the present invention should not limited by these examples.

EXAMPLES

Preparation of Ultraviolet Ray Absorbing Polymer Particles by Free Radical Emulsion Polymerization Example 1 (Invention) Polymer Particles Impregnated with Ultraviolet Ray Absorber 1

A stirred reactor containing 559.45 g of deionized water is heated to 80° C. and purged with $N_2$ for 1 hour followed by addition in sequence of 20 g of 10% Rhodapex CO-436 (Rhone-Poulenc) in deionized water, 0.2 g of $NaHCO_3$, 0.3 g of potassium persulfate, 0.05 g of sodium metabisulfate, and 20 g of ethyl acrylate (EA). The reaction is allowed to continue for an additional 2 hours. 0.2 g of 4,4-azobis(4-cyanovaleric acid) in 20 g of deionized water is then added to the reactor. An emulsion containing 189 g of deionized water, 30 g of 10% Rhodapex CO-436 in deionized water, 10 g of methacrylamide (MA), 4 g of ethylene glycol dimethacrylate (EGD), and 100 g of ethyl acrylate, 0.8 g of 4,4-azobis(4-cyanovaleric acid), 66 g of ultraviolet ray absorber 1 is added continuously for 1 hour. The reaction is allowed to continue for 3 more hours before the reactor is cooled down to room temperature. The latex prepared is filtered through an ultrafine filter (5 $\mu$m cut-off) to remove any coagulum. The resultant polymer particles are designated as PUV-1.

Polymer particles PUV-2 to PUV-11 are prepared in a similar manner. PUV-10 is impregnated with the ultraviolet ray absorber 3, and PUV-11 is impregnated with the ultraviolet ray absorber 4. Their compositions and sizes are listed in Table 1. In Table 1 St represents styrene, MMA represents methyl methacrylate, AEMA represents acetoacetoxyethyl methacrylate, DVB represents divinylbenzene, PEOMA represents poly(ethylene oxide) methacrylate.

Ultraviolet Ray Absorber 1

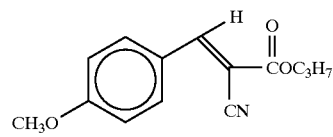

Ultraviolet Ray Absorber 2

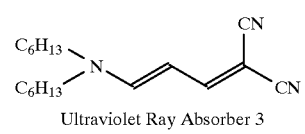

Ultraviolet Ray Absorber 3

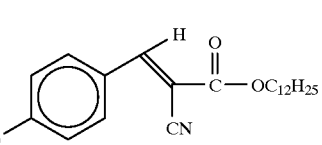

Ultraviolet Ray Absorber 4

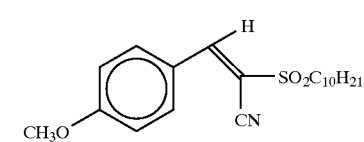

Example 2 (Invention) Polymer Particles Impregnated with ultraviolet ray absorber 1 and ultraviolet ray absorber 2

A stirred reactor containing 559.45 g of deionized water is heated to 80° C. and purged with $N_2$ for 1 hour followed by addition in sequence of 15 g of 10% Triton 770 (Union Carbide) in deionized water, 0.2 g of $NaHCO_3$, 0.3 g of potassium persulfate, and 0.05 g of sodium metabisulfate. An emulsion containing 5 g of 10% Triton 770 aqueous solution, 40 g of deionized water, and 10 g of ethyl methacrylate (EMA) is added to the reactor. The reaction is allowed to continue for an additional 2 hours. 0.2 g of 4,4-azobis(4-cyanovaleric acid) in 20 g of deionized water is then added to the reactor. An emulsion containing 149 g of deionized water, 30 g of 10% Triton 770 in deionized water, 6 g of 2-acrylamido-2-methylpropane sufonic acid (AMS), 2.4 g of ethylene glycol dimethacrylate (EGD), and 101.6 g of ethyl methacrylate, 0.8 g of 4,4-azobis(4-cyanovaleric acid), 40 g of ultraviolet ray absorber 1, and 40 g ultraviolet ray absorber 2 is added continuously for 1 hour. The reaction is allowed to continue for 3 more hours before the reactor is cooled down to room temperature. The latex prepared is filtered through an ultrafine filter (5 μm cut-off) to remove any coagulum.

The resultant polymer particles are designated as PUV-12 (Table 1).

Example 3 (Comparison) Polymer Particles Impreganated with Ultraviolet Ray Absorber 3 by Loading into a Preformed Latex An ethyl methacrylate-co-sodium methacryloyl-oxyethyl-1-sulfonate (95/5) copolymer latex at 20% solids is heated to 75° C. The ultraviolet ray absorber 3 is heated until it reaches its liquid state and is mixed with the polymer latex at a polymer to dye ratio of 3:1 with a high shear device to generate a coarse emulsion. The emulsion is then passed through a microfluidizer at 9000 psi for three passes. The final ultraviolet ray absorber impregnated polymer latex dispersion is allowed to cool to room temperature with stirring. The quality of the dispersion is tested by microscopic evaluation and is found to contain long needle ultraviolet ray absorber crystals.

TABLE 1

| Particle ID | Polymer Composition (wt %) | Polymer/ UV Absorber | Surfactant | Size (nm) |
|---|---|---|---|---|
| PUV-1 | EA/EDG/MA 89.5/3.0/7.5 | 2/1 | Rhodapex CO-436 | 80 |
| PUV-2 | EA/MA 92.5/7.5 | 2/1 | Rhodapex CO-436 | |
| PUV-3 | EMA/EA/ EGD/MA 46/46/3/5 | 2/1 | Triton 770 (Union Carbide) | 94 |
| PUV-4 | MMA/EGD/ MA 92/3/5 | 3/1 | Triton 770 | 91 |
| PUV-5 | MMA/EA/EGD/MA/AE MA | 3/1 | Triton 770 | 89 |
| PUV-6 | St/MA 95/5 | 2/1 | Rhodapex CO-436 | 75 |
| PUV-7 | St/DVB/MA 92/3/5 | 2/1 | Rhodapex CO-436 | 76 |
| PUV-8 | St/DVB/ PEOMA 92/3/5 | 2/1 | Rhodapex CO-436 | 76 |
| PUV-9 | St/EGD/MA 92/3/2 | 2/1 | Rhodapex CO-436 | 78 |
| PUV-10 | BMA/EGD 97/3 | 5/1 | Rhodapex CO-436 | |
| PUV-11 | BMA/EDG 97/3 | 5/1 | Rhodapex CO-436 | |
| PUV-12 | EMA/EDG/AMS 93/2/5 | 1.5/1 | Triton 770 | 94 |

Examples 4 to 13 Evaluation of Ultraviolet Ray Absorbing Efficiency

PUV-1 to PUV-12 ultraviolet ray absorbing particles are coated using gelatin as binder onto polyethylene terephthalate support that has been subbed with a terpolymer latex of acrylonitrile, vinylidene chloride, and acrylic acid. The polymer particle concentrations are adjusted so as to achieve a constant coating weight of about 107 mg/m$^2$ of ultraviolet ray absorber 1 or 162 mg/m$^2$ of ultraviolet ray absorber 3 or 159 mg/m$^2$ of ultraviolet ray absorber 4 based on the amount impregnated in each polymer particle. The gelatin is hardened with a bisvinylsulfone methane hardener. The optical density of the coating is measured on a Hewlett Packard 8452A Diode Array Spectrometer. The results are listed in Table 2. Examples 4 to 8, and Examples 13–15 contain the ultraviolet polymer particles of the present invention, and they have excellent ultraviolet ray absorbing efficiency. On the other hand, Examples 8 to 12 contain ultraviolet ray absorbing particles made of styrenic copolymers, and these particles have almost no ultraviolet ray absorbing power.

TABLE 2

| Coating | Description | Optical Density (340 nm) |
|---|---|---|
| Example 4 (Invention) | PUV-1/gelatin, total coverage 1076 mg/m$^2$ | 0.90 |
| Example 5 (Invention) | PUV-2/gelatin, Total coverage 1076 mg/m$^2$ | 0.89 |
| Example 6 (Invention) | PUV-3/gelatin, Total coverage 1076 mg/m$^2$ | 0.89 |
| Example 7 (Invention) | PUV-4/gelatin, Total coverage 1076 mg/m$^2$ | 0.95 |
| Example 8 (Invention) | PUV-5/gelatin, Total coverage 1076 mg/m$^2$ | 0.96 |
| Example 9 (Comparison) | PUV-6/gelatin, Total coverage 1076 mg/m$^2$ | 0.17 |
| Example 10 (Comparison) | PUV-7/gelatin, Total coverage 1076 mg/m$^2$ | 0.19 |
| Example 11 (Comparison) | PUV-8/gelatin, Total coverage 1076 mg/m$^2$ | 0.15 |
| Example 12 (Comparison) | PUV-9/gelatin, Total coverage 1076 mg/m$^2$ | 0.12 |
| Example 13 (Invention) | PUV-10/gelatin, Total coverage 1076 mg/m$^2$ | 0.90 |
| Example 14 (Invention) | PUV-11/gelatin, Total coverage 1076 mg/m$^2$ | 0.90 |
| Example 15 (Invention) | PUV-12/gelatin, Total coverage 1076 mg/m$^2$ | 1.92 (at 370 nm) |

The examples described above show that UV polymer particles made by the process of the present invention have excellent ultraviolet ray absorbing efficiency and provide suitable coating for photographic elements.

The invention has been described in detail with particular reference to certain preferred embodiments thereof, but it will be understood that variations and modifications can be effected within the spirit and scope of the invention.

What is claimed is:

1. A method of producing an imaging element comprising:

providing a support;

forming a light sensitive layer on the support;

mixing ethylenically unsaturated monomers selected from the group consisting of esters and amides of acrylic or methacrylic acid, vinyl esters, vinyl ethers and vinyl nitrites; an initiator; a surfactant and an ultraviolet ray absorber having the general formula:

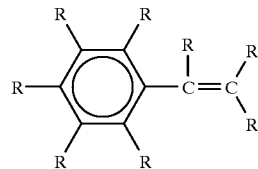

R is each independently selected from the group consisting of hydrogen, halogen, alkyl, aryl having from 6–20 carbon atoms, alkoxy, aryloxy, alkylthio, arylthio, amine, alkylamino, arylamino, hydroxyl, cyano, nitro, acylamino, sulfonyl, sulfamido, acyloxy, and oxycarbonyl;

polymerizing the mixture to form ultraviolet ray absorbing polymer particles;

coating the ultraviolet ray absorbing polymer particles and a binder on said support to form a layer.

2. The method according to claim 1, wherein the binder is selected from the group of hydrophilic colloids and hydrophobic polymer resin binders.

3. The method according to claim 1, wherein the weight ratio of binder to ultraviolet ray absorbing polymer particle is from 1:100 to 100:1.

4. A method of making ultraviolet ray absorbing particles comprising:

polymerizing a mixture of ethylenically unsaturated monomers selected from the group consisting of esters and amides of acrylic or methacrylic acid, vinyl esters, vinyl ethers and vinyl nitrites; an initiator; a surfactant and an ultraviolet ray absorber having the general formula:

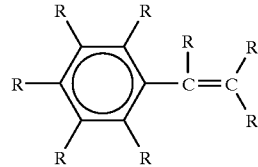

R is independently selected from the group consisting of hydrogen, halogen, alkyl, aryl having from 6–20 carbon atoms, alkoxy, aryloxy, alkylthio, arylthio, amine, alkylamino, arylamino, hydroxyl, cyano, nitro, acylamino, sulfonyl, sulfamido, acyloxy, and oxycarbonyl.

5. A method of producing an imaging element comprising:

providing a support;

forming a light sensitive layer on the support;

mixing ethylenically unsaturated monomers selected from the group consisting of esters and amides of acrylic or methacrylic acid, vinyl esters, vinyl ethers and vinyl nitrites; an initiator; a surfactant and an ultraviolet ray absorber having the general formula:

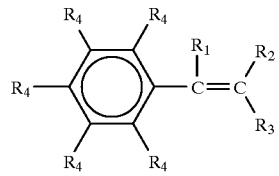

$R_4$ is independently selected from the group consisting of hydrogen, halogen, alkyl, aryl having from 6–20 carbon atoms, alkoxy, aryloxy, alkylthio, arylthio, amine, alkylamino, arylamino, hydroxyl, cyano, nitro, acylamino, sulfonyl, sulfamido, acyloxy, oxycarbonyl, and two neighboring $R_4$ groups can form a 5 or 6-member ring;

$R_1$ is a hydrogen or alkyl;

$R_2$ and $R_3$ are independently selected from the group consisting of cyano, —$COOR_9$, $CONHR_9$, and $SO_2R_9$ where $R_9$ is an alkyl or aryl group;

polymerizing the mixture to form ultraviolet ray absorbing polymer particles and;

coating the polymer particles with a binder on said support to form a layer.

6. The method according to claim 5, wherein the binder is selected from the group of hydrophilic colloids and hydrophobic polymer resin binders.

7. The method according to claim 5, wherein the weight ratio of binder to ultraviolet ray absorbing polymer particle is from 1:100 to 100:1.

8. A method of making ultraviolet ray absorbing particles comprising:

polymerizing a mixture of ethylenically unsaturated monomers selected from the group consisting of esters and amides of acrylic or methacrylic acid, vinyl esters, vinyl ethers and vinyl nitrites; an initiator; a surfactant and an ultraviolet ray absorber having the general formula:

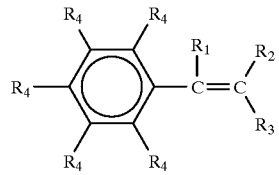

$R_4$ is independently selected from the group consisting of hydrogen, halogen, alkyl, aryl having from 6–20 carbon atoms, alkoxy, aryloxy, alkylthio, arylthio, amine, alkylamino, arylamino, hydroxyl, cyano, nitro, acylamino, sulfonyl, sulfamido, acyloxy, oxycarbonyl; and two neighboring $R_4$ groups can form a 5 or 6-member ring;

$R_1$ is a hydrogen or alkyl;

$R_2$ and $R_3$ are independently selected from the group consisting of cyano, —$COOR_9$, $CONHR_9$, and $SO_2R_9$ where $R_9$ is an alkyl or aryl group.

* * * * *